(12) United States Patent
Zhang et al.

(10) Patent No.: US 12,217,319 B2
(45) Date of Patent: Feb. 4, 2025

(54) METHOD OF INTERFACING DISCRETE DIGITAL WORKSHOP INFORMATION SYSTEM

(71) Applicants: Machinery Technology Development Co., Ltd, Beijing (CN); Instrumentation Technology And Economy Institute, Beijing (CN)

(72) Inventors: Sheng Zhang, Beijing (CN); Bin Xu, Beijing (CN); Hua Zhao, Beijing (CN); Dan Liu, Beijing (CN); Junguang Tan, Beijing (CN); Jian Jiao, Beijing (CN); Yedan Na, Beijing (CN); Pengfei Niu, Beijing (CN)

(73) Assignees: Machinery Technology Development Co., Ltd, Beijing (CN); Instrumentation Technology And Economy Institute, Beijing (CN)

( * ) Notice: Subject to any disclaimer, the term of this patent is extended or adjusted under 35 U.S.C. 154(b) by 0 days.

(21) Appl. No.: 18/434,867

(22) Filed: Feb. 7, 2024

(65) Prior Publication Data
US 2024/0289702 A1    Aug. 29, 2024

(30) Foreign Application Priority Data

Feb. 27, 2023   (CN) .......................... 202310166624.X

(51) Int. Cl.
   *G06Q 50/04*       (2012.01)
   *G06Q 10/0631*     (2023.01)
   *G06Q 10/08*       (2024.01)

(52) U.S. Cl.
   CPC ......... *G06Q 50/04* (2013.01); *G06Q 10/0631* (2013.01); *G06Q 10/08* (2013.01)

(58) Field of Classification Search
   CPC ......... Y02P 90/30; Y02P 90/02; G06Q 50/04; G06Q 10/0631; G06Q 10/08; G05B 19/418; G05B 2219/31372; G06F 9/451
   (Continued)

(56) References Cited

U.S. PATENT DOCUMENTS 8,195,532 B2 * 6/2012 Zwerger ................ G06Q 10/02
                                                 705/28
8,417,360 B2 * 4/2013 Sustaeta ................ H04L 67/125
                                                 700/28
(Continued)

FOREIGN PATENT DOCUMENTS

CN     103810576 A   *   5/2014
CN     111399450 A   *   7/2020
(Continued)

OTHER PUBLICATIONS

Cui Zhong-Bao, et al., Research on a new discrete intelligent manufacturing model for automobile body parts, Journal of Machine Design, 2020, pp. 262-265, vol. 37, S1.

(Continued)

*Primary Examiner* — Charles Guiliano
*Assistant Examiner* — Letoria G Knight
(74) *Attorney, Agent, or Firm* — Bayramoglu Law Offices LLC

(57) ABSTRACT

A method of interfacing a discrete digital workshop information system is provided, where the information system includes mutual integration among product lifecycle management (PLM), enterprise resource planning (ERP), a manufacturing execution system (MES), an energy management system (EMS), and a warehouse management system (WMS) of a finished product. A method of interfacing based on a data dictionary fusing different function datasets is proposed to solve the problems of a current discrete industry (Continued)

information system, such as single in function, a small amount of integrated information, a large number of "information islands" existing, incapable of achieving full-process informatization management and control, difficulty in product quality tracing and the like. By the method, it is possible to realize flexible production in a discrete manufacturing industry, precise management and control of a production process, significant improvement in product quality and significant reduction in operating costs.

9 Claims, 8 Drawing Sheets

(58) Field of Classification Search
USPC .......................................................... 705/7.12
See application file for complete search history.

(56) References Cited

U.S. PATENT DOCUMENTS

| | | | | |
|---|---|---|---|---|
| 11,860,613 | B2 * | 1/2024 | Maury | .................. G06F 16/906 |
| 2003/0143515 | A1 * | 7/2003 | Fromm-Ayass | ....... G06Q 10/10 434/72 |
| 2015/0134092 | A1 * | 5/2015 | Lieners | .............. G05B 19/4188 700/96 |
| 2016/0070258 | A1 | 3/2016 | Raviola et al. | |
| 2016/0275628 | A1 * | 9/2016 | Mishra | ................... G06Q 50/04 |
| 2019/0332995 | A1 * | 10/2019 | Tseng | ..................... G06Q 10/06 |
| 2022/0019204 | A1 * | 1/2022 | Maury | .............. G05B 19/4188 |
| 2022/0230117 | A1 * | 7/2022 | Baer | ............... G06Q 10/06395 |
| 2022/0340304 | A1 * | 10/2022 | Ruiz Moreno | ...... G05B 19/418 |
| 2023/0297584 | A1 * | 9/2023 | Maturana | ............... G06Q 10/00 707/769 |

FOREIGN PATENT DOCUMENTS

| | | | | |
|---|---|---|---|---|
| CN | 109492965 | B * | 6/2021 | ............. G06K 17/00 |
| CN | 113327060 | A * | 8/2021 | ............. G06Q 10/06 |
| CN | 114297837 | A | 4/2022 | |
| CN | 115079655 | A | 9/2022 | |
| CN | 115456380 | A | 12/2022 | |
| KR | 102375966 | B1 * | 3/2022 | ............. G06Q 10/10 |
| WO | WO-2020146230 | A1 * | 7/2020 | ....... G06Q 10/06375 |

OTHER PUBLICATIONS

Li Long-Xun, et al., Research and Application of Energy Management Module for MES System in Tobacco Enterprises, Computer Knowledge and Technology, 2018, pp. 60-62, vol. 14, No. 28.

* cited by examiner

METHOD OF INTERFACING DISCRETE DIGITAL WORKSHOP INFORMATION SYSTEM

CROSS-REFERENCE TO THE RELATED APPLICATION

This application is based upon and claims priority to Chinese Patent Application No. 202310166624.X filed on Feb. 27, 2023, the entire contents of which are incorporated herein by reference.

TECHNICAL FIELD

The present application belongs to the technical field of electrical digital data processing, and in particular relates to a method of interfacing a discrete digital workshop information system.

BACKGROUND

Discrete manufacturing means that a product basically does not change materially during a production process, and only a shape and combination of materials change. That is, the product is assembled from various materials with a certain quantitative ratio between the product and a required material. For example, the quantity components of one product, and the quantity of parts of a component are definitive, and cannot be changed. For example, manufacturing industries such as rockets, airplanes, weapons and equipment, ships, electronic equipment, engineering machinery, machine tools, automobiles and automobile parts, medicine, rail transit, etc. are all discrete manufacturing industries.

In our country, discrete manufacturing enterprises have made rapid progress in product production technology, and have formed a relatively complete production and manufacturing system, which can substantially meet the needs of national economy and national defense construction. However, compared with advanced foreign countries, the overall level of equipment digitalization in a production workshop is generally low, and the problem related to "information islands" in the production workshop is serious. The production process of a small manufacturing enterprise relies more on manual labor. Some large enterprises have only realized digitization of some process sections, but have not achieved full-process automated production and informatization management and control, and thus product quality tracing is difficult. There is a lack of unified definitions of equipment integration data and information system integration data, one-to-one analysis and integration is required for different manufacturers and different models of equipment. In particular, non-uniform equipment lead to single information system function, and a small amount of integrated information, which cannot meet the needs of intelligent development in the discrete manufacturing industry. These problems lead to enterprises being unsuitable for flexible production, uncontrollable production processes, unstable product quality, low production efficiency, and high operating costs.

SUMMARY

A purpose of the present application is to provide a method of interfacing a discrete digital workshop information system, so as to solve the problems of an information system in a discrete industry workshop in the BACKGROUND, such as single in function, a small amount of integrated information, a large number of "information islands" existing, incapable of achieving full-process informatization management and control in a production process, difficulty in product quality tracing and the like. In order to achieve the above purpose, with respect to a discrete digital workshop information system, including product lifecycle management (PLM), enterprise resource planning (ERP), a manufacturing execution system (MES), an energy management system (EMS) and a warehouse management system (WMS), the present provides a method of interfacing based on a data dictionary fusing different function datasets, so as to solve the problems of interfacing and interconnection interoperability of field equipment with the information system, thereby improving the overall digitalization and intelligence level of the industry, and then achieving intelligent transformation and upgrading.

Specifically, the technical solutions of the present application are implemented as follows:

Provided herein is a method of interfacing a discrete digital workshop information system, wherein the discrete digital workshop information system includes product lifecycle management (PLM), enterprise resource planning (ERP), a manufacturing execution system (MES), an energy management system (EMS), and a warehouse management system (WMS) of a finished product, wherein the method of interfacing the discrete digital workshop information system includes interfacing the PLM with the ERP, interfacing the PLM with the MES, interfacing the ERP with the MES, interfacing the MES with the WMS, interfacing the ERP with the WMS, interfacing the MES with the EMS, interfacing the MES with personnel, production equipment, inspection equipment, logistics equipment, and auxiliary equipment;

the PLM is to cooperate with the ERP to implement a product lifecycle design, to form a manufacturing BOM function module, and a drawing document management function module; a dataset of BOM master data generated by the manufacturing BOM function module is transmitted to the MES and the ERP respectively; a basic material information dataset generated by the drawing document management function module is transmitted to the ERP, and a process file dataset generated by the drawing document management function module is transmitted to the MES for guiding a workshop to carry out process production; a dataset for interfacing the PLM with the ERP includes a basic material dataset, and the dataset of BOM master data;

the ERP is to implement a basic information management function module, a master plan management function module, and a sales management function module of a product, and formed datasets include a production order dataset and a sales warehouse-out order dataset; the master plan management function module is to generate the production order dataset and transmit the production order dataset to the MES of the workshop; the sales management function module is to receive a finished product warehouse-in order dataset of the MES and a delivery notice dataset of the WMS, and the ERP is to transmit the sales warehouse-out order dataset to the WMS; a dataset for interfacing the ERP with the MES includes the production order dataset and the finished product warehouse-in order dataset;

the MES is to implement a basic information management function module, a plan management function module, a production management function module, a BOM management function module, an equipment management function module, a quality management function module, and a logistics management function module of the product, formed datasets include an information push dataset, a production schedule dataset, a control instruction dataset, a finished product warehouse-in order dataset, and a production task dataset, which are transmitted to the personnel, the production equipment, the inspection equipment, the logistics equipment, the auxiliary equipment, the EMS, and the WMS respectively, a dataset received by the MES includes BOM master data and a process file of the PLM, basic data and a production order of the ERP, warehouse-in performance of the WMS, information feedback of the personnel, data feedback of the inspection equipment, and data feedback of the logistics equipment; a dataset for interfacing the PLM with the MES includes the dataset of BOM master data and the process file dataset;

the WMS is to implement a warehouse-in management function module and a warehouse-out management function module of the product, and formed dataset include a warehouse-in performance dataset, a delivery notice dataset, and a warehouse-out instruction dataset; the warehouse-in management function module of the WMS is to receive the finished product warehouse-in order dataset of the MES, feedback the warehouse-in performance dataset to the MES; the warehouse-out management function module of the WMS is to receive the sales warehouse-out order dataset of the ERP, perform warehouse-out delivery according to a warehouse-out principle, feedback the delivery notice dataset to the sales management function module of the ERP, issue the warehouse-out instruction dataset to warehousing equipment, and receive a warehouse-out result dataset from the warehousing equipment; a dataset for interfacing the MES with the WMS of a finished product warehouse includes a production warehouse-in order dataset, and the warehouse-in performance dataset; a dataset for interfacing the ERP with the WMS of the finished product warehouse includes the sales warehouse-out order dataset and the delivery notice dataset;

the EMS is to implement an energy consumption data collection function module and an energy consumption data statistical function module of the production equipment, receive the production task dataset formed by the plan management function module of the MES and a dataset of energy data of the production equipment, form an energy consumption data statistical result dataset and transmit the energy consumption data statistical result dataset to the plan management function module of the MES; a dataset for interfacing the MES with the EMS includes the production task dataset and an energy consumption data statistical dataset.

Further, the interfacing the PLM with the ERP includes the following steps:
step 1: generating, by process personnel, a basic material dataset and the dataset of BOM master data through the manufacturing BOM function module and the drawing document management function module in the PLM;
step 2: transmitting, by the PLM, the basic material dataset and the dataset of BOM master data to the basic information management function module of the ERP.

Further, the interfacing the PLM with the MES includes the following steps:
step 1: maintaining, by the process personnel, the dataset of BOM master data and the process file dataset through the manufacturing BOM function module and the drawing document management function module in the PLM;
step 2: synchronizing, by the PLM, the dataset of BOM master data and the process file dataset to the BOM management function module and the production management function module corresponding to the MES respectively through an interface.

Further, the interfacing the ERP with the MES includes the following steps:
step 1: establishing, by a planner, a production plan in a master production plan function module of the ERP, generating the production order dataset, and transmitting the production order dataset to the plan management function module of the MES;
step 2: refining and decomposing, by the plan management function module of the MES, the received production order dataset, to form a production schedule dataset, a personnel information push dataset, a dataset of interfacing a control instruction of the inspection equipment with a control instruction of the logistics equipment that are transmitted to the production equipment, the personnel, the inspection equipment, and the logistics equipment respectively;
step 3: after the product is produced, generating, by the production management function module of the MES, the finished product warehouse-in order dataset and transmitting the finished product warehouse-in order dataset to the sales management function module of the ERP.

Further, the interfacing the MES with the WMS includes the following steps:
step 1: completing, by a final inspector, a final inspection in the MES, and performing packaging and palletizing of the finished product, to transmit the finished product warehouse-in order dataset to the warehouse-in management function module of the WMS through the production management function module;
step 2: decomposing, by the warehouse-in management function module of the WMS, the received finished product warehouse-in order dataset into a warehouse-in instruction dataset of the warehousing equipment, to schedule the warehousing equipment to perform a warehouse-in operation;
step 3: after the warehousing equipment completes the warehouse-in operation, forming a warehouse-in result dataset and transmitting the warehouse-in result dataset to the warehouse-in management function module of the WMS, and forming, by the warehouse-in management function module of the WMS, the warehouse-in performance dataset and transmitting the warehouse-in performance dataset to the production management function module of the MES.

Further, the interfacing the ERP with the WMS includes the following steps:
step 1: making, by a saler, a sales warehouse-out order in the sales management function module of the ERP, to form the sales warehouse-out order dataset and transmit the sales warehouse-out order dataset to the warehouse-out management function module of the WMS, and forming, by the warehouse-out management function module of the WMS, the warehouse-out instruction dataset, to schedule the warehousing equipment to perform a warehouse-out operation;
step 2: after the warehousing equipment completes the warehouse-out operation, forming a warehouse-out result dataset and transmitting the warehouse-out result dataset to the warehouse-out management function module of the WMS, and forming, by the warehouse-out management function module of the WMS, the delivery notice dataset and transmitting the delivery notice dataset to the sales management function module of the ERP.

Further, the interfacing the MES with the EMS includes the following steps:
step 1: receiving, by the energy consumption data collection function module of the EMS, the production task dataset generated by the plan management function module of the MES;
step 2: performing, by the EMS, collection of energy data of main energy-consuming production equipment according to the production task dataset, forming the energy consumption data statistical result dataset, and transmitting the energy consumption data statistical result dataset to the plan management function module of the MES;

Further, the interfacing the MES with equipment includes the following steps:
step 1: when the product or a container carrying the product passes through the inspection equipment, automatically identifying coding information of the product or coding information of the container carrying the product, wherein the coding information of the product or the coding information of the container carrying the product includes information of a plain code, a barcode, and RFID;
step 2: after acquiring, by the quality management function module of the MES, the coding information of the product or the coding information of the container carrying the product through the data feedback of the inspection equipment, determining to issue the control instruction dataset to controllers of different logistics equipment through the equipment management function module;
step 3: transmitting, by the plan management function module of the MES, the production schedule dataset to the production equipment, and transmitting, by the equipment management module of the MES, the control instruction dataset to the production equipment, the inspection equipment, and the logistics equipment; transmitting, by a controller of the logistics equipment, the data feedback dataset to the logistics management function module of the MES after performing instruction processing;
step 4: transmitting, by the inspection equipment, the data feedback dataset to the quality management function module of the MES.

Further, the method of interfacing the discrete digital workshop information system is achieved based on a data dictionary, and the data dictionary includes datasets for different functional purposes; an integration manner includes a database middleware, Web Service, and an ESB bus.

Further, the EMS may be an independent information system or an energy management module of the MES.

The method of the present application has the following advantages:

The present application is aimed at the following situations: when implementing digital workshop information system integration, an information system integrator in the discrete manufacturing industry faces some problems, such as a small amount of information regarding interfacing, an interface being off-standard or non-standard, etc., resulting in repetitive, tedious and inefficient work. The present application proposes a method of interfacing based on a data dictionary fusing different function datasets, and the method defines function modules integrated by different information systems and a data flow integrated between modules. The method can realize a bottom-up vertical information integration from a field equipment to an information system in a discrete digital workshop and a horizontal integration between information systems, thereby realizing the overall collaborative integration of the entire digital workshop, and can improve the intelligence level of the industry as a whole, thereby improving the production efficiency and product quality of an enterprise. At the same time, with the technical solutions of the present application, it is possible to realize flexible production in the discrete manufacturing industry, precise management and control of a production process, significant improvement in product quality and significant reduction in operating costs, and thus the present application has important significance for improving the intelligent level of the discrete digital workshop.

DETAILED DESCRIPTION OF THE EMBODIMENTS

The technical solutions of the present application will be described clearly and completely below with reference to specific embodiments. However, those skilled in the art should understand that the embodiments described below are only used to illustrate the present application and should not be regarded as limiting the scope of the present application. Based on the embodiments of the present application, all other embodiments obtained by those of ordinary skill in the art without creative efforts fall within the protection scope of the present application.

The preferred implementation of the present application will be described in detail below with reference to embodiments. It should be understood that the following embodiments are given for illustrative purposes only and are not intended to limit the protection scope of the present application. Those skilled in the art can make various modifications and substitutions to the present application without departing from the purpose and spirit of the present application, and all of these modifications and substitutions fall within the scope claimed by the claims of the present application.

Figure 1:
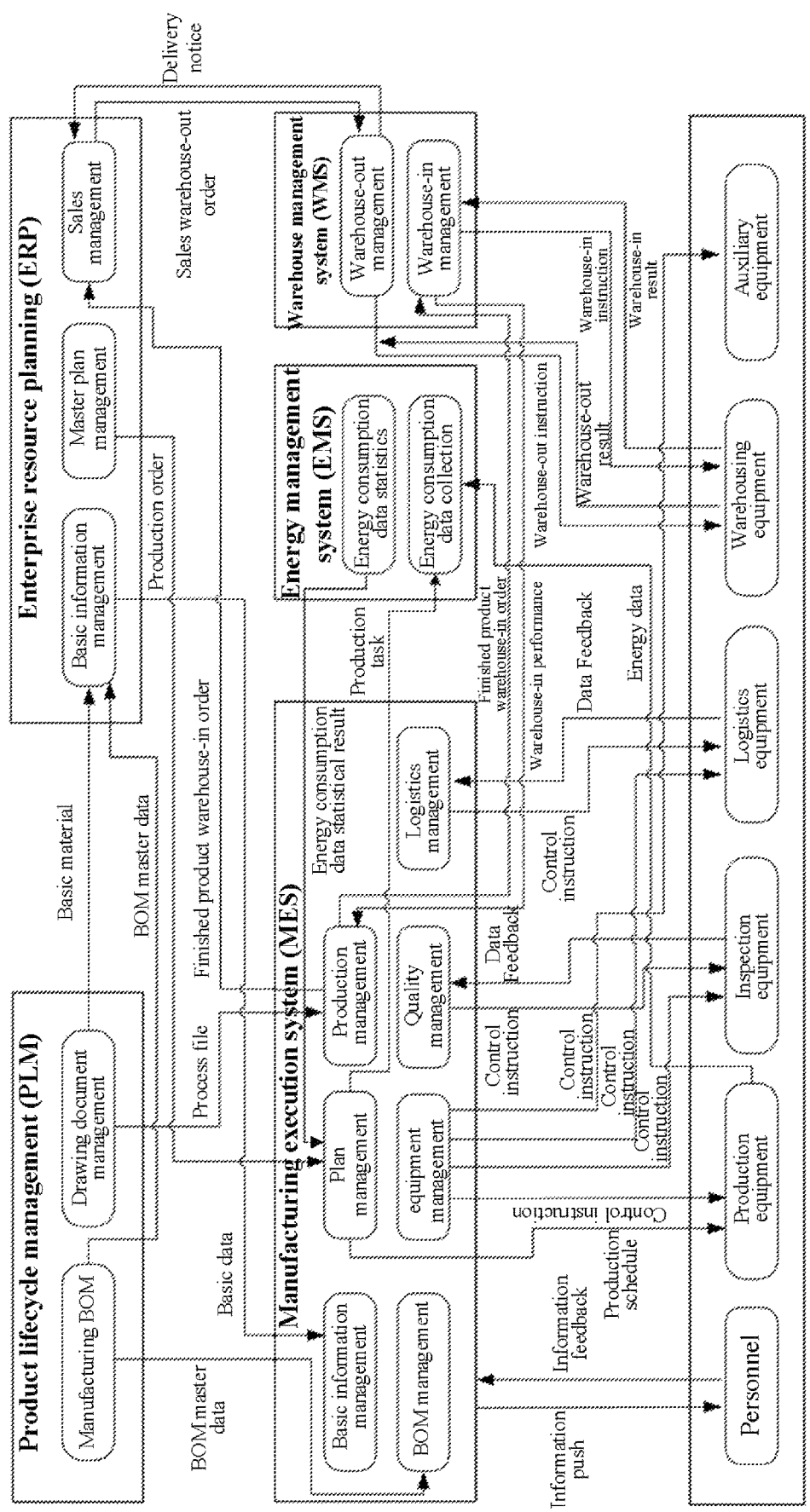
FIG. 1 shows a flow diagram of interfacing an a discrete digital workshop information system according to one embodiment of the present application.

The digital workshop information system of the present application mainly includes information systems such as ERP, PLM, MES, EMS, WMS, etc. Information of an integrated interface between the information systems and a function integration process are shown in FIG. 1, wherein a rounded rectangle in the figure represents a function module, and a connection line represents an integration relationship of function modules between different information systems, and a text on the connection line represents an integrated dataset; FIG. 2 to FIG. 8 are data flow diagrams of mutual integration between different information systems, wherein a rounded rectangle represents a function module, a parallel quadrilateral represents formed datasets and a circle represents an external object.

The meanings of the English abbreviations are as follows:

The following abbreviations are used herein: Product Lifecycle Management (PLM), Enterprise Resource Planning (ERP), Manufacturing Execution System (MES), Energy Management System (EMS), Warehouse Management System (WMS), Bill of Material (BOM), Enterprise Service Bus (ESB).

The present application provides a method of interfacing a discrete digital workshop information system, wherein the discrete digital workshop information system includes PLM, ERP, MES, EMS), and (WMS of a finished product, wherein the method of interfacing the discrete digital workshop information system includes interfacing the PLM with the ERP, interfacing the PLM with the MES, interfacing the ERP with the MES, interfacing the MES with the WMS, interfacing the ERP with the WMS, interfacing the MES with the EMS, interfacing the MES with personnel, production equipment, inspection equipment, logistics equipment, and auxiliary equipment.

The main contents for function integration of each information system are as follows:

1. Main integration contents of the PLM:
    the PLM cooperates with the ERP to implement a product lifecycle design, to form a manufacturing BOM function module, and a drawing document management function module;
    a dataset of BOM master data generated by the manufacturing BOM function module is transmitted to the MES and the ERP respectively; a basic material information dataset generated by the drawing document management function module is transmitted to the ERP, and a process file dataset generated by the drawing document management function module is transmitted to the MES for guiding a workshop to carry out process production.

2. Main integration contents of the ERP:
    the ERP implements a basic information management function module, a master plan management function module, and a sales management function module of a product, to form a production order dataset and a sales warehouse-out order dataset;
    the ERP implements a basic information management function module, a master plan management function module, and a sales management function module of a product, and formed datasets include a production order dataset and a sales warehouse-out order dataset;
    the master plan management function module generates the production order dataset and transmits the production order dataset to the MES of the workshop; the sales management function module receives a finished product warehouse-in order dataset of the MES and a delivery notice dataset of the WMS, and the ERP transmits the sales warehouse-out order dataset to the WMS;

3. Main integration contents of the MES:
    the MES implements a basic information management function module, a plan management function module, a production management function module, a BOM management function module, an equipment management function module, a quality management function module, and a logistics management function module of the product, formed datasets include an information push dataset, a production schedule dataset, a control instruction dataset, a finished product warehouse-in order dataset, and a production task dataset, which are transmitted to the personnel, the production equipment, the inspection equipment, the logistics equipment, the auxiliary equipment, the EMS, and the WMS respectively, a dataset received by the MES includes BOM master data and a process file of the PLM, basic data and a production order of the ERP, warehouse-in performance of the WMS, information feedback of the personnel, data feedback of the inspection equipment, and data feedback of the logistics equipment;
    the MES implements data collection and monitoring control of equipment in the entire production process in the digital workshop including a production process, an inspection process, and a logistics process; decomposes a master plan generated by the ERP into execution plans for each process and issues an operating instruction to the equipment; receives PLM process data to generate operation guidance and basic information of each process section; and generates a finished product warehouse-in instruction to and issues the instruction to the WMS of the finished product warehouse after the finished product is offline;
    the MES manages and controls quality of a raw material, a process product, and a product throughout the entire production process, to form ultimately complete file of the productd. At the same time, the MES carries out all-round management of people, a machine, a material, a method, and environment, wherein, the people, the machine, the material, the method, and the environment are abbreviations for five main factors that affect product quality in a comprehensive quality management theory. People refer to personnel who make a product; the machine refers to equipment used to make a product; the material refers to a raw material used to make a product; the method refers to one used to make a product; the environment refers to one in which a product is made.

4. Main integration contents of the WMS of a finished product:
    the WMS implements a warehouse-in management function module and a warehouse-out management function module of the product, and formed datasets include a warehouse-in performance dataset, a delivery notice dataset, and a warehouse-out instruction dataset;
    the warehouse-in management function module of the WMS receives the finished product warehouse-in order dataset of the MES, and feedbacks the warehouse-in performance dataset to the MES;
    the warehouse-out management function module of the WMS receives the sales warehouse-out order dataset of the ERP, performs warehouse-out delivery according to a warehouse-out principle, feedbacks the delivery notice dataset to the sales management function module of the ERP, issues the warehouse-out instruction dataset to warehousing equipment, and receives a warehouse-out result dataset from the warehousing equipment.

5. Main integration contents of the EMS:

the EMS implements an energy consumption data collection function module and an energy consumption data statistical function module of the production equipment, to form an energy consumption data statistical dataset;

the EMS collects main energy data of water, electricity and gas of production and processing equipment, and forms an energy consumption data statistical dataset; receives the production task dataset formed by the plan management function module of the MES and a dataset of energy data of the production equipment, to perform statistical analysis of energy consumption data according to plan management and transmit a result of energy consumption data statistics to the plan management function module of the MES.

Through the solutions of interfacing the discrete digital workshop information system disclosed in the present application, standardized interfacing between different information systems can be realized, thereby forming unified interfacing for different manufacturers and different models of equipment, thereby forming an organic collaborative and highly integrated software system, which can guide an enterprise to achieve a purpose of flexible production and a completely controllable production process.

Figure 2:
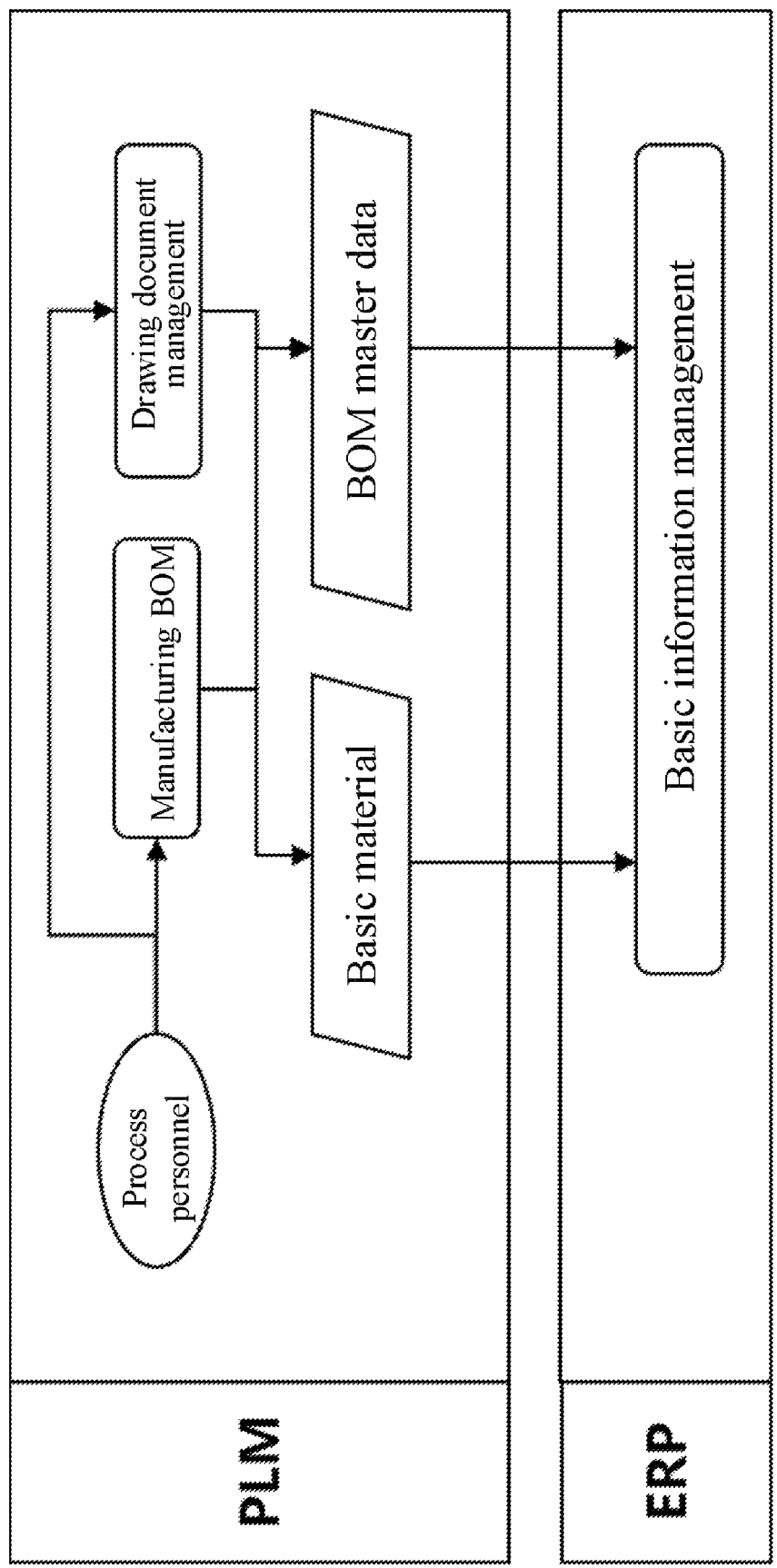
FIG. 2 shows a data flow diagram of interfacing PLM with ERP.

The integration between various information systems is as follows:

1. Interfacing the PLM with the ERP a) A Data Flow Diagram of Interfacing PLM with ERP is Shown in FIG. 2.

The process personnel generates the basic material dataset and the dataset of BOM master data through the manufacturing BOM function module and the drawing document management function module in the PLM;

The PLM transmits the basic material dataset and the dataset of BOM master data to the basic information management function module of the ERP.

b) Interface Dataset: The Interface Dataset Includes the Basic Material Dataset and the Dataset of BOM Master Data. See Table 1 and Table 2.

TABLE 1

Basic material dataset

| Serial number | Field name | Data type | Necessary/Optional | Description |
|---|---|---|---|---|
| 1 | number | string | necessary | material unique code |
| 2 | name | string | necessary | |
| 3 | model | string | necessary | |
| 4 | materialGroup | string | necessary | |
| 5 | baseUnit | string | necessary | unit of measurement name |
| 6 | weight | float | necessary | KG |

TABLE 2

Dataset of BOM master data

| Serial number | Field name | Data type | Necessary/Optional | Description |
|---|---|---|---|---|
| 1 | number | string | necessary | material coding of parent item |
| 2 | name | string | necessary | material coding of parent item |
| 3 | bomGroup | string | necessary | |
| 4 | usageType | string | necessary | |
| 5 | material | string | necessary | material coding |
| 6 | productQty | integer | optional | default: 1 |
| 7 | yield | float | necessary | percentage % |
| Information entry | | | | |
| 1 | seq | integer | necessary | serial number |
| 2 | material | string | necessary | |
| 3 | consumeFixQty | float | necessary | |
| 4 | standardRootingGroup | string | necessary | |
| 5 | Wpseq | string | necessary | |
| 6 | operation | string | necessary | |

The interfacing the PLM with the ERP can realize automatic generation of material basic data and manufacturing data during a design process of a product, and such data can be transmitted to the ERP, thereby achieving organic collaboration of the design process, a material management process, and a manufacturing process.

Figure 3:
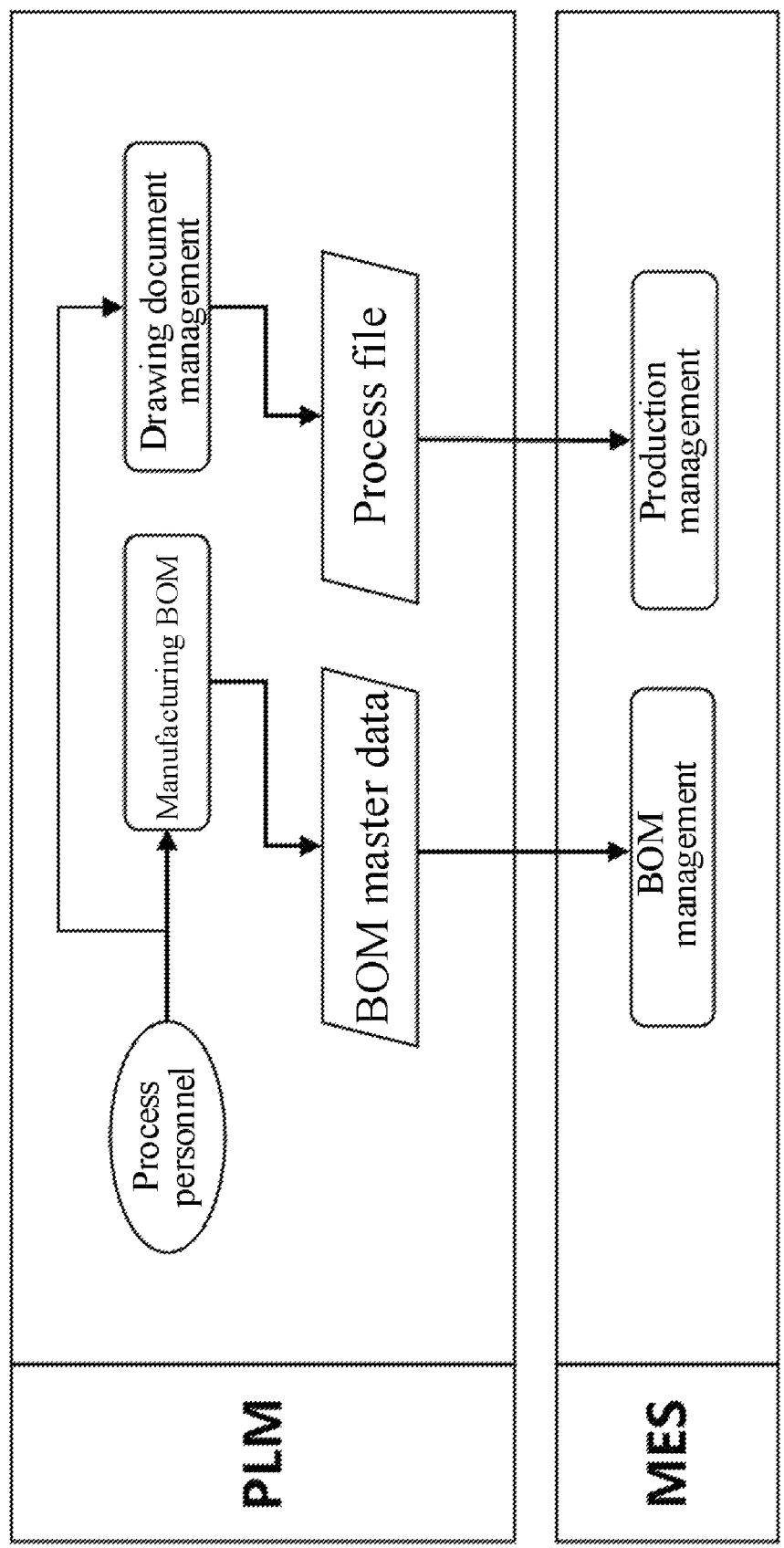
FIG. 3 shows a data flow diagram of interfacing PLM with MES.

2. Interfacing of the PLM with the MES a) A Data Flow Diagram of Interfacing the PLM with the MES is Shown in FIG. 3.

The process personnel maintains the dataset of BOM master data and the process file dataset through the manufacturing BOM function module and the drawing document management function module in the PLM;

The PLM synchronizes the dataset of BOM master data and the process file dataset to the BOM management function module and the production management function module corresponding to the MES respectively through an interface.

During the production process, operating personnel can obtain the process file dataset transmitted by the PLM online through the interface in MES, to guide on-site production.

b) Interface Dataset: The Interface Dataset Includes the Dataset of BOM Master Data and the Process File Dataset. See Table 3 and Table 4.

TABLE 3

Dataset of BOM master data

| Serial number | Field name | Data type | Necessary/Optional | Description |
|---|---|---|---|---|
| 1 | processName | string | necessary | process Name |
| 2 | materialCode | integer | necessary | material coding |
| 3 | productQty | float | necessary | default: 1 |
| 4 | itemMatCode | string | necessary | |
| 5 | itemQty | float | necessary | sub-material quantity |
| 6 | itemUnitName | string | optional | incoming unit name |

TABLE 4

Process file dataset

| Serial number | Field name | Data type | Necessary/Optional | Description |
|---|---|---|---|---|
| 1 | FileType | string | necessary | |
| 2 | FilePathName | string | necessary | |

The interfacing the PLM with the MES can realize automatic generation of material basic data and manufacturing BOM master data during the design process of the product, and such data can be transmitted to the MES, thereby achieving organic collaboration of the design process, a product manufacturing process, and operation guidance.

Figure 4:
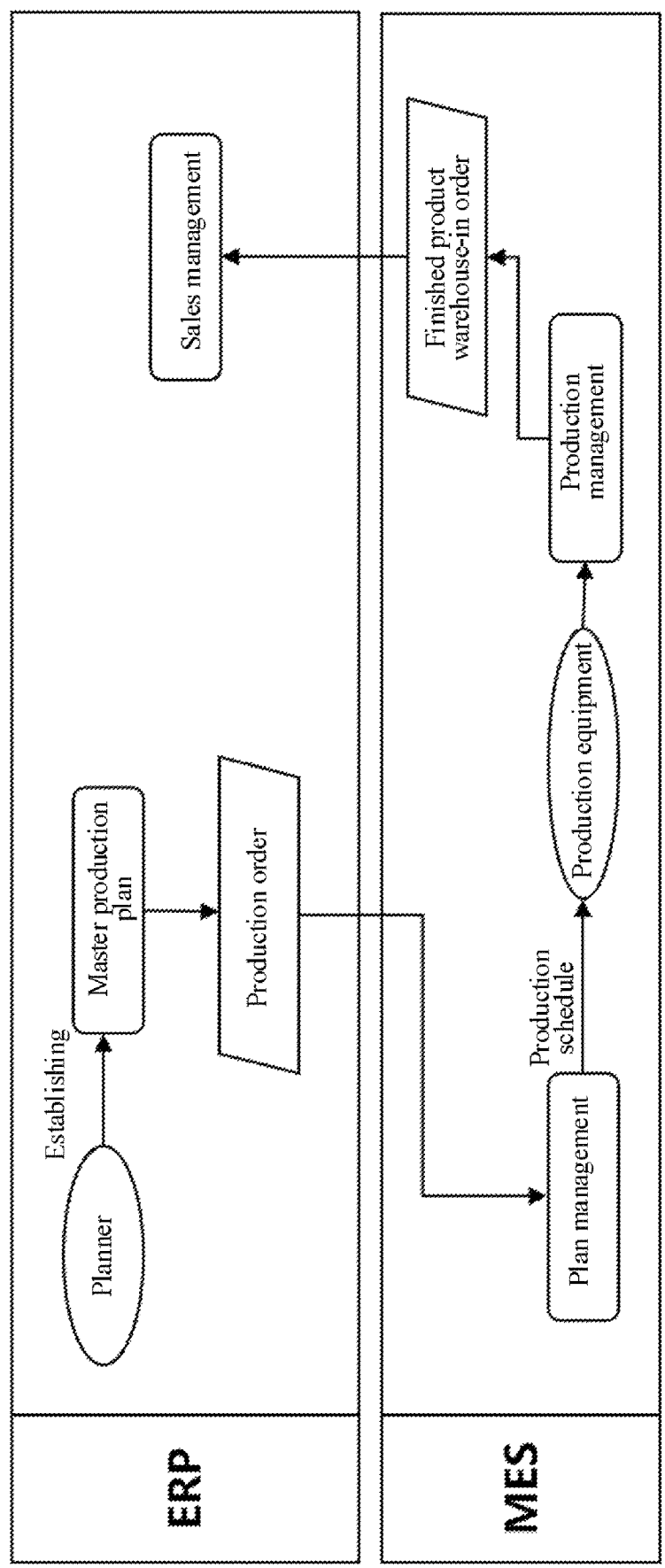
FIG. 4 shows a data flow diagram of interfacing ERP with MES.

3. Interfacing the ERP with the MES a) A Data Flow Diagram of Interfacing the ERP with the MES is Shown in FIG. 4.

A planner establishes a production plan in a master production plan function module of the ERP, generates the production order dataset, and transmits the production order dataset to the plan management function module of the MES;

The plan management function module of the MES refines and decomposes the received production order dataset, to form a production schedule dataset, a personnel information push dataset, a dataset of interfacing a control instruction of the inspection equipment with a control instruction of the logistics equipment (see FIG. 1) and transmit them to the production equipment, the personnel, the inspection equipment, and the logistics equipment (see FIG. 1) respectively;

After the product is produced, the production management function module of the MES generates the finished product warehouse-in order dataset and transmits the finished product warehouse-in order dataset to the sales management function module of the ERP.

After the warehouse-in is completed, the finished product warehouse-in order dataset is transmitted to the ERP for carrying out accounting logic processing of a warehouse-out business.

b) Interface Dataset: The Interface Dataset Includes the Production Order Dataset and the Finished Product Warehouse-In Order Dataset. See Table 5 and Table 6.

TABLE 5

Production order dataset

| Serial number | Field name | Data type | Necessary/ Optional | Description |
|---|---|---|---|---|
| 1 | erpPoNo | string | necessary | unique identification |
| 2 | procType | string | necessary | added: 0; deleted: 1 |
| 3 | erpSoNo | string | necessary | |
| 4 | matCode | string | necessary | |
| 5 | matName | string | necessary | |
| 6 | deliveryMonth | string | necessary | yyyymm |
| 7 | planStartDate | string | necessary | yyyymmdd |
| 8 | planFinishDate | string | necessary | yyyymmdd |
| 9 | planQty | float | necessary | |
| 10 | matUnitName | string | optional | default transmission unit name |
| 11 | processName | string | necessary | default transmission package |
| 12 | custName | string | optional | |
| 13 | custCode | string | optional | |
| 14 | remark | string | optional | |

TABLE 6

Finished product warehouse-in order dataset

| Serial number | Field name | Data type | Necessary/ Optional | Description |
|---|---|---|---|---|
| 1 | srcNumber | string | necessary | production order number |
| 2 | number | integer | necessary | business document number for MES |
| 3 | bizDate | string | necessary | warehouse-in time yyyymmddhhmmss |
| 4 | bizType | string | necessary | default value (provided by ERP) |
| 5 | transactionType | string | necessary | default value (provided by ERP) |
| Information entry | | | | |
| 1 | seq | integer | necessary | serial number |
| 2 | material | string | necessary | material coding |
| 3 | qty | float | necessary | warehouse-in quantity |
| 4 | warehouse | string | optional | default value (provided by ERP) |

The interfacing the ERP with MES can realize transmission of an order to MES during the manufacturing process of the product, to guide MES to decompose a production order and perform production scheduling for specific equipment, thereby achieving intelligent management during the production process of the product.

Figure 5:
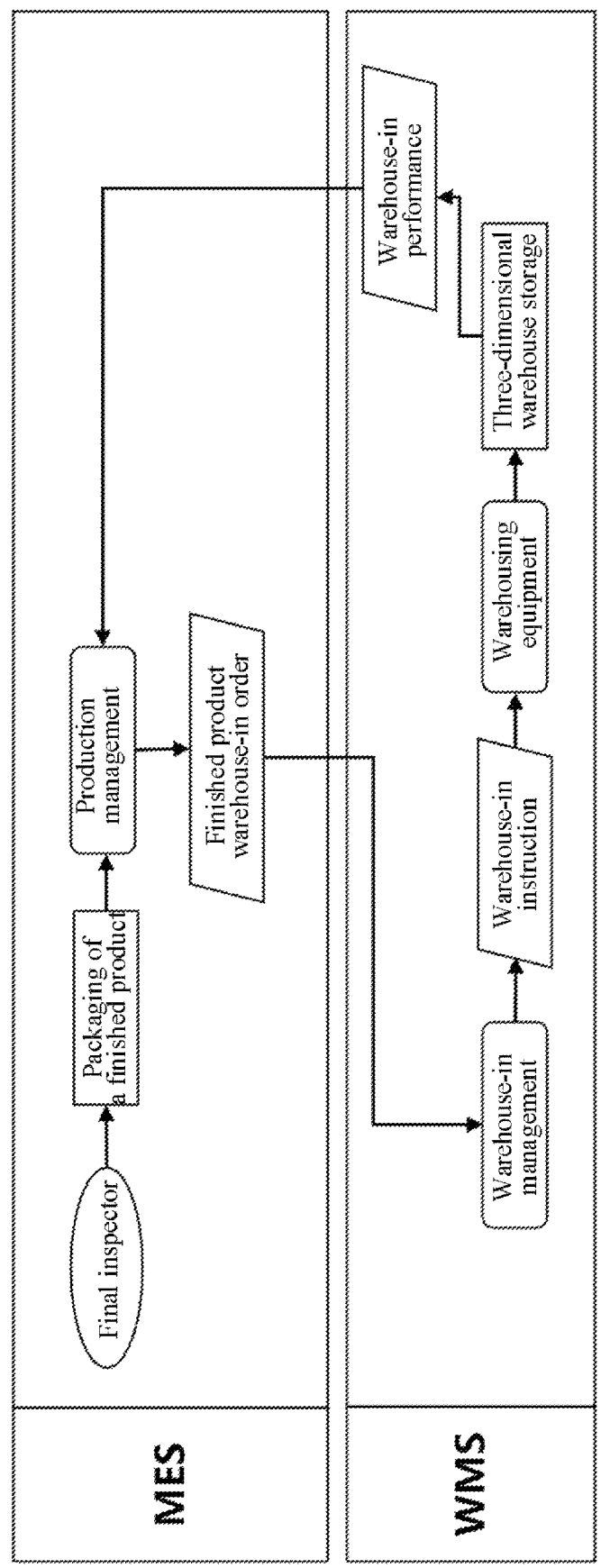
FIG. 5 shows a data flow diagram of interfacing MES with WMS of a finished product warehouse.

4. Interfacing the MES with the WMS of the Finished Product a) A Data Flow Diagram of Interfacing the WMS with the MES of the Finished Product Warehouse is Shown in FIG. 5.

A final inspector completes a final inspection in the MES, and performs packaging and palletizing of the finished product, to transmit the finished product warehouse-in order dataset to the warehouse-in management function module of the WMS through the production management function module;

The warehouse-in management function module of the WMS decomposes the received finished product warehouse-in order dataset into a warehouse-in instruction dataset of the warehousing equipment, to schedule the warehousing equipment to perform a warehouse-in operation;

After the warehousing equipment completes the warehouse-in operation, a warehouse-in result dataset is formed and transmitted to the warehouse-in management function module of the WMS, and the warehouse-in management function module of the WMS forms the warehouse-in performance dataset and transmits the warehouse-in performance dataset to the production management function module of the MES.

b) Interface Dataset: The Interface Dataset Includes a Production Warehouse-In Order Dataset and the Warehouse-In Performance Dataset. See Table 7 and Table 8.

TABLE 7

Finished product warehouse-in order dataset

| Serial number | Field name | Data type | Necessary/Optional | Description |
|---|---|---|---|---|
| 1 | auditSerialNo | string | necessary | unique identification |
| 2 | packagingNo | integer | necessary | |
| 3 | procType | integer | necessary | new modification: 0; deleted: 1 |
| 4 | erpPoNo | string | necessary | |
| 5 | erpSoNo | string | necessary | |
| 6 | matCode | string | necessary | |
| 7 | matName | string | necessary | |
| 8 | specification | string | necessary | |
| 9 | packQty | float | necessary | |
| 10 | matUnit | string | optional | default transmission unit name |
| 11 | applyDate | string | necessary | YYYYMMDDHHMMSS |

TABLE 8

Warehouse-in performance dataset

| Serial number | Field name | Data type | Necessary/Optional | Description |
|---|---|---|---|---|
| 1 | packagingNo | string | 50 | unique identification |
| 2 | putinDate | string | 20 | yyyymmddhhmmss |

Figure 6:
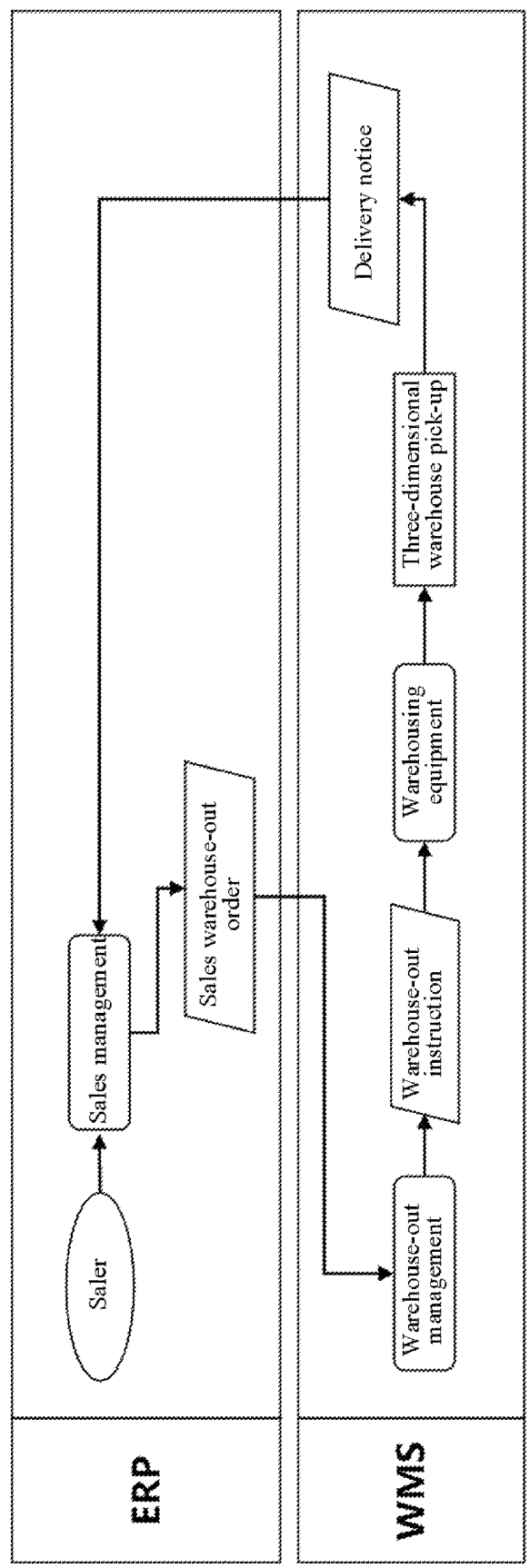
FIG. 6 shows a data flow diagram of interfacing ERP with WMS of a finished product warehouse.

5. Interfacing the ERP with the WMS of the Finished Product a) A Data Flow Diagram of Interfacing the ERP with the WMS is Shown in FIG. 6:

The interfacing the ERP with the WMS includes the following steps:

a saler makes a sales warehouse-out order in the sales management function module of the ERP, to form the sales warehouse-out order dataset and transmit the sales warehouse-out order dataset to the warehouse-out management function module of the WMS, and the warehouse-out management function module of the WMS forms the warehouse-out instruction dataset, to schedule the warehousing equipment to perform a warehouse-out operation;

after the warehousing equipment completes the warehouse-out operation, a warehouse-out result dataset is formed and transmitted to the warehouse-out management function module of the WMS, and the warehouse-out management function module of the WMS forms the delivery notice dataset and transmits the delivery notice dataset to the sales management function module of the ERP.

b) Interface Dataset: The Interface Dataset Includes the Sales Warehouse-Out Order Dataset and the Delivery Notice Dataset. See Table 9 and Table 10.

TABLE 9

Sales warehouse-out order dataset

| Serial number | Field name | Data type | Necessary/Optional | Description |
|---|---|---|---|---|
| 1 | number | string | necessary | unique identification |
| 2 | bizDate | string | necessary | yyyymmddhhmmss |
| 3 | StorateOrgUnit | string | optional | basic data |
| 4 | bizType | string | necessary | ERP provides a default value |
| 5 | transactionType | string | necessary | ERP provides a default value |
| 6 | description | string | optional | remark |
| | Information entry | | | |
| 1 | Seq | integer | necessary | serial number |
| 2 | material | string | necessary | basic data |
| 3 | qty | float | necessary | quantity returned is negative |
| 4 | warehouse | string | optional | transmission warehouse coding |

TABLE 10

Delivery notice dataset

| Serial number | Field name | Data type | Necessary/Optional | Description |
|---|---|---|---|---|
| 1 | number | string | necessary | unique identification |
| 2 | bizDate | string | necessary | yyyymmddhhmmss |
| 3 | StorateOrgUnit | string | optional | basic data |
| 4 | bizType | string | necessary | ERP provides a default value |
| 5 | transactionType | string | necessary | ERP provides a default value |
| 6 | description | string | optional | |
| | Information entry | | | |
| 1 | Seq | integer | necessary | serial number |
| 2 | material | string | necessary | basic data |
| 3 | qty | float | necessary | quantity returned is negative |
| 4 | warehouse | string | optional | transmission warehouse coding |

The interfacing the ERP with the WMS can realize automatic product warehouse-out operation through the warehousing equipment during the sales process of the product. After the warehouse-out is completed, ERP can automatically perform a financial settlement process for inventory goods.

Figure 7:
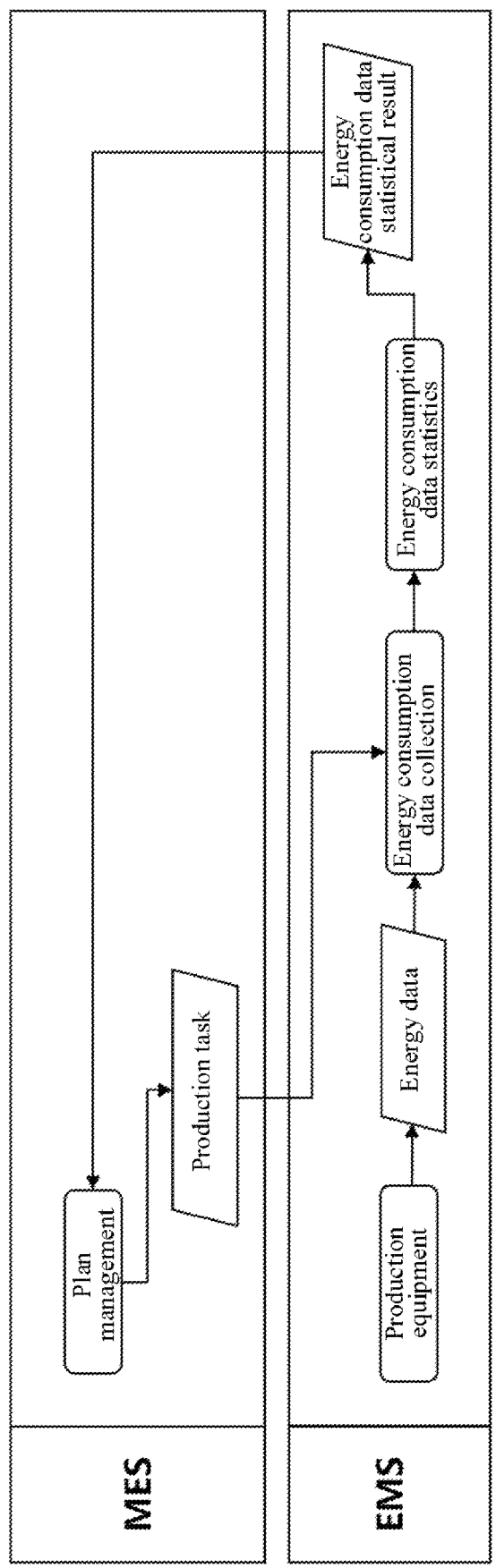
FIG. 7 shows a data flow diagram of interfacing MES with EMS.

6. Interfacing the MES with the EMS a) A Data Flow Diagram of Interfacing the MES with the EMS is Shown in FIG. 7:

The energy consumption data collection function module of the EMS receives the production task dataset generated by the plan management function module of the MES;

The EMS collects energy consumption data of main energy-consuming production equipment according to the production task dataset, and forms the energy consumption data statistical result dataset and transmits the energy consumption data statistical result dataset to the plan management function module of the MES.

b) Interface Dataset: The Interface Dataset Includes the Production Task Dataset and an Energy Consumption Data Statistical Dataset. See Table 11 and Table 12.

TABLE 11

Production task dataset

| Serial number | Field name | Data type | Necessary/ Optional | Description |
|---|---|---|---|---|
| 1 | JobOrderID | string | necessary | unique identification number |
| 2 | MaterialDefName | string | necessary | output material name |
| 3 | MaterialDefID | string | necessary | output material number |
| 4 | VMajor | string | necessary | major version number of output material |
| 5 | ProducedLotNo | string | necessary | production lot |
| 6 | ScheduledQuantity | integer | necessary | scheduled quantity |
| 7 | UoM | enumeration | optional | unit |
| 8 | ScheduledStartTime | datetime | optional | scheduled start time |
| 9 | ScheduledEndTime | datetime | optional | scheduled completion time |

TABLE 12

Energy consumption data statistical dataset

| Serial number | Field name | Data type | Necessary/ Optional | Description |
|---|---|---|---|---|
| 1 | JobOrderID | string | necessary | unique identification number |
| 2 | EquipmentID | string | necessary | equipment unique coding |
| 3 | WaterQty | float | optional | consumption of water, unit: ton |
| 4 | ElecQty | float | optional | consumption of power, unit: degree |
| 5 | VaporQty | float | optional | consumption of gas, unit: cubic |
| 6 | StartTime | datetime | optional | scheduled start time |
| 7 | EndTime | datetime | optional | scheduled completion time |

The interfacing the MES with the EMS can realize energy data collection for main energy-consuming production equipment during the production process of the product, and then production scheduling can be rationally made according to a production plan of the equipment, so as to achieve a purpose of energy-saving and efficient production.

7. Interfacing the MES with the Equipment

Figure 8:
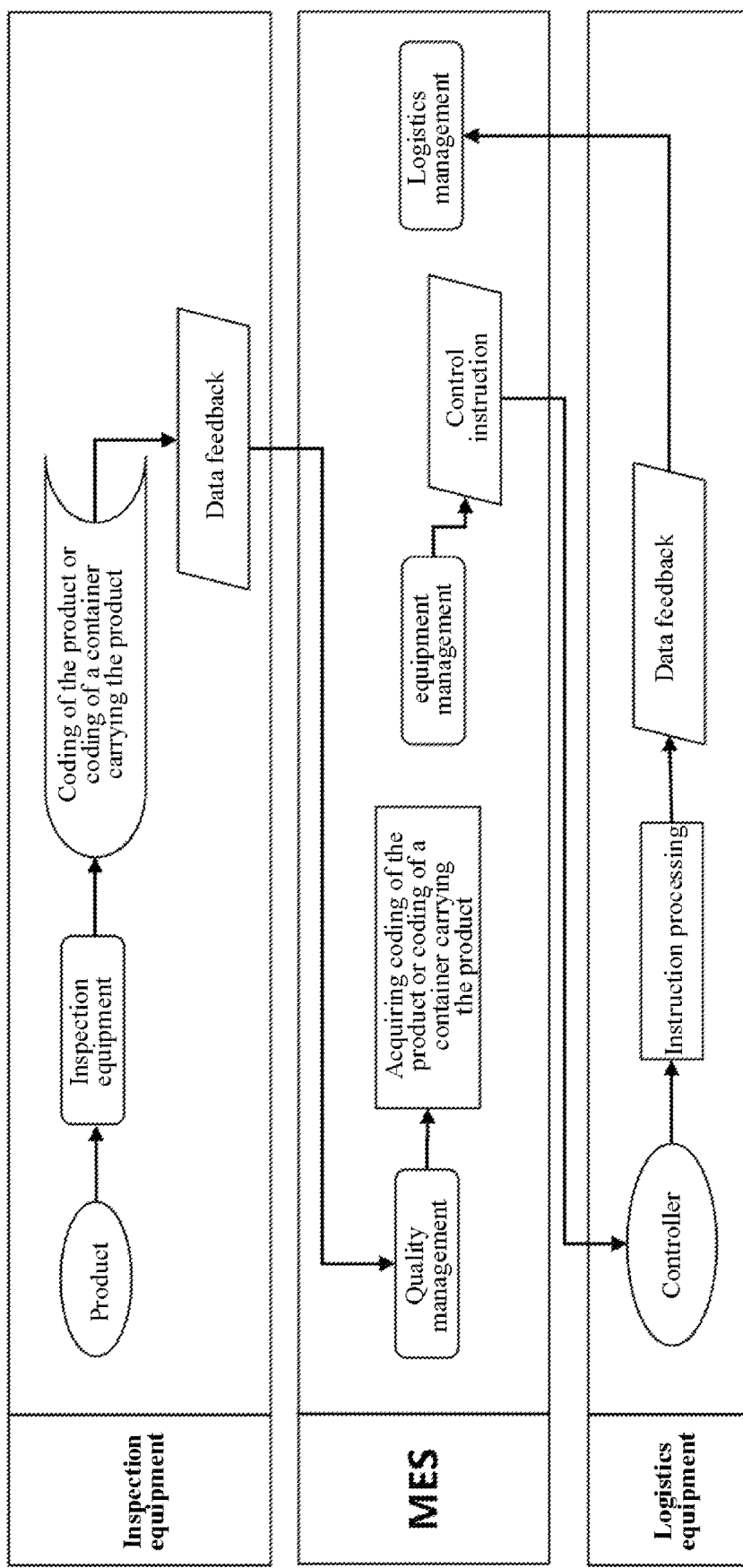
FIG. 8 shows a data flow diagram of interfacing MES with the equipment.

A Data Flow Diagram of Interfacing the MES with the Equipment is Shown in FIG. 8.

When the product or a container carrying the product passes through the inspection equipment, coding information of the product or coding information of the container carrying the product is automatically identified, wherein the coding information of the product or the coding information of the container carrying the product includes information of a plain code, a barcode, and RFID;

After the quality management function module of the MES acquires the coding information of the product or the coding information of the container carrying the product through the data feedback of the inspection equipment, it is determined, through the equipment management function module, to issue the control instruction dataset to controllers of different logistics equipment;

The plan management function module of the MES transmits the production schedule dataset to the production equipment, and the equipment management module of the MES transmits the control instruction dataset to the production equipment, the inspection equipment, and the logistics equipment (see FIG. 1); a controller of the logistics equipment transmits the data feedback dataset to the logistics management function module of the MES after performing instruction processing;

The inspection equipment transmits the data feedback dataset to the quality management function module of the MES.

The method of interfacing the discrete digital workshop information system is achieved based on a data dictionary fusing different function datasets; an interfacing manner includes a database middleware, Web Service, and an ESB bus.

The EMS may be an independent information system or an energy management module of the MES.

Although the present application has been described in detail with general descriptions and specific embodiments above, it is obvious to those skilled in the art that some modifications or improvements can be made on the basis of the present application. Therefore, these modifications or improvements made without departing from the spirit of the present application all fall within the scope claimed by the present application.

What is claimed is:

1. A method of interfacing a discrete digital workshop information system, wherein the discrete digital workshop information system comprises Product Lifecycle Management (PLM), Enterprise Resource Planning (ERP), Manufacturing Execution System (MES), Energy Management System (EMS), and Warehouse Management System (WMS) of a finished product, wherein the method comprises interfacing the PLM with the ERP, interfacing the PLM with the MES, interfacing the ERP with the MES, interfacing the MES with the WMS, interfacing the ERP with the WMS, interfacing the MES with the EMS, and interfacing the MES with production equipment, inspection equipment, logistics equipment, and auxiliary equipment, and wherein modules of the discrete digital workshop information system comprise machine readable instructions stored on non-transitory storage, and configured to perform functions of the respective modules in response to execution of the respective modules by at least one processor;

the PLM is configured to cooperate with the ERP to implement a product lifecycle design, to form a manufacturing BOM function module, and a drawing document management function module; a dataset of BOM master data generated by the manufacturing BOM function module is transmitted to the MES and the ERP respectively; a basic material information dataset generated by the drawing document management function module is transmitted to the ERP, and a process file dataset generated by the drawing document management function module is transmitted to the MES for guiding a workshop to carry out process production; a dataset for interfacing the PLM with the ERP comprises a basic material dataset, and the dataset of BOM master data;

the ERP is configured to implement a basic information management function module, a master plan management function module, and a sales management function module of a product, and formed datasets comprise a production order dataset and a sales warehouse-out order dataset; the master plan management function module is to generate the production order dataset and transmit the production order dataset to the MES of the workshop; the sales management function module is to receive a finished product warehouse-in order dataset of the MES and a delivery notice dataset of the WMS, and the ERP is to transmit the sales warehouse-out order dataset to the WMS; a dataset for interfacing the ERP with the MES comprises the production order dataset and the finished product warehouse-in order dataset;

the MES is configured to implement a basic information management function module, a plan management function module, a production management function module, a BOM management function module, an equipment management function module, a quality management function module, and a logistics management function module of the product, formed datasets comprise an information push dataset, a production schedule dataset, a control instruction dataset, a finished product warehouse-in order dataset, and a production task dataset, which are transmitted to the production equipment, the inspection equipment, the logistics equipment, the auxiliary equipment, the EMS, and the WMS respectively, a dataset received by the MES comprises BOM master data and a process file of the PLM, basic data and a production order of the ERP, warehouse-in performance of the WMS, data feedback of the inspection equipment, and data feedback of the logistics equipment; a dataset for interfacing the PLM with the MES comprises the dataset of BOM master data and the process file dataset;

the WMS is configured to implement a warehouse-in management function module and a warehouse-out management function module of the product, and formed datasets comprise a warehouse-in performance dataset, a delivery notice dataset, and a warehouse-out instruction dataset; the warehouse-in management function module of the WMS is to receive the finished product warehouse-in order dataset of the MES, feedback the warehouse-in performance dataset to the MES; the warehouse-out management function module of the WMS is to receive the sales warehouse-out order dataset of the ERP, perform warehouse-out delivery according to a warehouse-out principle, feedback the delivery notice dataset to the sales management function module of the ERP, issue the warehouse-out instruction dataset to warehousing equipment, and receive a warehouse-out result dataset from the warehousing equipment; a dataset for interfacing the MES with the WMS of a finished product warehouse comprises a production warehouse-in order dataset, and the warehouse-in performance dataset; a dataset for interfacing the ERP with the WMS of the finished product warehouse comprises the sales warehouse-out order dataset and the delivery notice dataset;

the EMS is configured to implement an energy consumption data collection function module and an energy consumption data statistical function module of the production equipment, receive the production task dataset formed by the plan management function module of the MES and a dataset of energy data of the production equipment, form an energy consumption data statistical result dataset and transmit the energy consumption data statistical result dataset to the plan management function module of the MES; a dataset for interfacing the MES with the EMS comprises the production task dataset and an energy consumption data statistical dataset;

the interfacing the PLM with the MES comprises the following steps:
  step 1: maintaining the dataset of BOM master data and the process file dataset through the manufacturing BOM function module and the drawing document management function module in the PLM;
  step 2: synchronizing, by the PLM, the dataset of BOM master data and the process file dataset to the BOM management function module and the production management function module of the MES through an interface;

the interfacing the MES with the EMS comprises the following steps:
  step 1: receiving, by the energy consumption data collection function module of the EMS, the production task dataset generated by the plan management function module of the MES;
  step 2: performing, by the EMS, collection of energy data of a main energy-consuming production equipment according to the production task dataset, forming the energy consumption data statistical result dataset, and transmitting the energy consumption data statistical result dataset to the plan management function module of the MES, the energy consumption statistical dataset including a job order identifier and an equipment identifier, the energy consumption statistical dataset used by the MES to generate production scheduling configured to perform energy saving and energy efficient production; and the interfacing the MES with equipment comprises the following steps:
  step 1: in response to the product or a container carrying the product passing through the inspection equipment, automatically identifying coding information of the product or coding information of the container carrying the product, wherein the coding information of the product or the coding information of the container carrying the product comprises information of a plain code, a barcode, and RFID;
  step 2: after acquiring, by the quality management function module of the MES, the coding information of the product or the coding information of the container carrying the product through the data feedback of the inspection equipment, determining to issue the control instruction dataset to controllers of different logistics equipment through the equipment management function module;
  step 3: transmitting, by the plan management function module of the MES, the production schedule dataset to the production equipment, and transmitting, by an equipment management module of the MES, the control instruction dataset to the production equipment, the inspection equipment, and the logistics equipment; transmitting, by a controller of the logistics equipment, a data feedback dataset to the logistics management function module of the MES after performing instruction processing; and step 4: transmitting, by the inspection equipment, the data feedback dataset to the quality management function module of the MES; and automatically operating, by at least one processor, the production equipment, the inspection equipment, the logistics equipment, and the auxiliary equipment based on the basic material information dataset, the dataset of BOM master data, the process file dataset, the production order dataset, the sales warehouse-out order dataset, the finished product warehouse-in order dataset, the delivery notice dataset, the information push dataset, the production schedule dataset, the control instruction dataset, the production task dataset, the energy consumption data statistical dataset, and the data feedback dataset, according to the PLM, ERP, MES, EMS, and WMS.

2. The method of interfacing the discrete digital workshop information system according to claim 1, wherein the interfacing the PLM with the ERP comprises the following steps:

step 1: generating the basic material dataset and the dataset of BOM master data through the manufacturing BOM function module and the drawing document management function module in the PLM; and step 2: transmitting, by the PLM, the basic material dataset and the dataset of BOM master data to the basic information management function module of the ERP.

3. The method of interfacing the discrete digital workshop information system according to claim 1, wherein the interfacing the ERP with the MES comprises the following steps:

step 1: establishing, by a planner, a production plan in a master production plan function module of the ERP, generating the production order dataset, and transmitting the production order dataset to the plan management function module of the MES;

step 2: refining and decomposing, by the plan management function module of the MES, a received production order dataset, to form a production schedule dataset and a dataset of interfacing a control instruction of the inspection equipment with a control instruction of the logistics equipment that are transmitted to the production equipment, the inspection equipment, and the logistics equipment, respectively; and step 3: after the product is finished, generating, by the production management function module of the MES, the finished product warehouse-in order dataset and transmitting the finished product warehouse-in order dataset to the sales management function module of the ERP.

4. The method of interfacing the discrete digital workshop information system according to claim 1, wherein the interfacing the MES with the WMS comprises the following steps:

step 1: completing, by a final inspector, a final inspection in the MES, and performing packaging and palletizing of the finished product, to transmit the finished product warehouse-in order dataset to the warehouse-in management function module of the WMS through the production management function module;

step 2: decomposing, by the warehouse-in management function module of the WMS, the received finished product warehouse-in order dataset into a warehouse-in instruction dataset of the warehousing equipment, to schedule the warehousing equipment to perform a warehouse-in operation; and step 3: after the warehousing equipment completes the warehouse-in operation, forming a warehouse-in result dataset and transmitting the warehouse-in result dataset to the warehouse-in management function module of the WMS, and forming, by the warehouse-in management function module of the WMS, the warehouse-in performance dataset and transmitting the warehouse-in performance dataset to the production management function module of the MES.

5. The method of interfacing the discrete digital workshop information system according to claim 1, wherein the interfacing the ERP with the WMS comprises the following steps:

step 1: making, by a saler, a sales warehouse-out order in the sales management function module of the ERP, to form the sales warehouse-out order dataset and transmit the sales warehouse-out order dataset to the warehouse-out management function module of the WMS, and forming, by the warehouse-out management function module of the WMS, the warehouse-out instruction dataset, to schedule the warehousing equipment to perform a warehouse-out operation; and step 2: after the warehousing equipment completes the warehouse-out operation, forming a warehouse-out result dataset and transmitting the warehouse-out result dataset to the warehouse-out management function module of the WMS, and forming, by the warehouse-out management function module of the WMS, the delivery notice dataset and transmitting the delivery notice dataset to the sales management function module of the ERP.

6. The method of interfacing the discrete digital workshop information system according to claim 1, wherein the method is achieved based on a data dictionary, and the data dictionary comprises datasets for different functional purposes; and an integration manner comprises a database middleware, Web Service, and an ESB bus.

7. The method of interfacing the discrete digital workshop information system according to claim 1, wherein the EMS can be an independent information system or an energy management module of the MES.

8. The method of interfacing the discrete digital workshop information system according to claim 1, wherein the energy consumption statistical dataset further includes a scheduled start time and a scheduled end time.

9. The method of interfacing the discrete digital workshop information system according to claim 1, wherein the energy consumption statistical dataset further includes at least one of: an indication of an amount of consumed electrical power, an indication of an amount of consumed gas, or an indication of an amount of consumed electrical water.

* * * * *